(12) United States Patent
Zhang et al.

(10) Patent No.: US 12,038,982 B2
(45) Date of Patent: Jul. 16, 2024

(54) METHOD OF EXTRACTING TABLE INFORMATION, ELECTRONIC DEVICE, AND STORAGE MEDIUM

(71) Applicant: BEIJING BAIDU NETCOM SCIENCE TECHNOLOGY CO., LTD., Beijing (CN)

(72) Inventors: Yue Zhang, Beijing (CN); Zhou Fang, Beijing (CN); Yabing Shi, Beijing (CN); Ye Jiang, Beijing (CN); Chunguang Chai, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/957,188

(22) Filed: Sep. 30, 2022

(65) Prior Publication Data

US 2023/0038091 A1 Feb. 9, 2023

(30) Foreign Application Priority Data

Oct. 8, 2021 (CN) .......................... 202111173960.4

(51) Int. Cl.
*G06F 7/00* (2006.01)
*G06F 16/22* (2019.01)
(Continued)

(52) U.S. Cl.
CPC ........ *G06F 16/906* (2019.01); *G06F 16/2282* (2019.01); *G06F 40/177* (2020.01); *G06F 40/20* (2020.01)

(58) Field of Classification Search
CPC .. G06F 16/906; G06F 16/2282; G06F 16/287; G06F 16/35; G06F 40/177; G06F 40/20; G06F 40/289; G06N 20/00
See application file for complete search history.

(56) References Cited

U.S. PATENT DOCUMENTS 7,542,958 B1 * 6/2009 Warren .................. G06Q 10/10
706/48
8,645,391 B1 * 2/2014 Wong ...................... G06F 16/80
707/758

(Continued)

FOREIGN PATENT DOCUMENTS

| CN | 110362620 | 10/2019 |
| CN | 110659527 | 1/2020 |
| CN | 113326797 | 8/2021 |

OTHER PUBLICATIONS

Search Report issued in corresponding European Patent Application No. 22199884.2, dated Jan. 19, 2023.

*Primary Examiner* — Mohammed R Uddin
(74) *Attorney, Agent, or Firm* — Pillsbury Winthrop Shaw Pittman, LLP

(57) ABSTRACT

A method of extracting a table information, an electronic device, and a storage medium are provided, which relate to fields of artificial intelligence and big data, in particular to fields of machine learning, knowledge graph, intelligent search and intelligent recommendation, and may be used for an intelligent extraction of an information in a table and other scenarios. The method includes: performing a clustering based on features of a plurality of rows of cells and/or features of a plurality of columns of cells in a table, so as to determine candidate header cells in the table; and performing an information extraction on the table based on the candidate header cells, so as to extract attribute-attribute value pairs in the table.

20 Claims, 4 Drawing Sheets

(51) Int. Cl.
  *G06F 16/906*    (2019.01)
  *G06F 40/177*    (2020.01)
  *G06F 40/20*     (2020.01)

(56) References Cited

U.S. PATENT DOCUMENTS

| | | | |
|---|---|---|---|
| 11,436,249 B1* | 9/2022 | Zhang | G06F 16/254 |
| 11,768,857 B2* | 9/2023 | Nilsson | G06F 16/2255 |
| | | | 707/741 |
| 2006/0117253 A1* | 6/2006 | Polash | G06F 40/103 |
| | | | 715/234 |
| 2007/0143317 A1* | 6/2007 | Hogue | G06F 16/353 |
| 2009/0018996 A1* | 1/2009 | Hunt | G06Q 30/02 |
| 2009/0327115 A1* | 12/2009 | Schilder | G06F 16/36 |
| | | | 705/35 |
| 2010/0257507 A1* | 10/2010 | Warren | G06F 8/41 |
| | | | 345/619 |
| 2012/0036130 A1* | 2/2012 | Light | G06F 40/30 |
| | | | 707/769 |
| 2012/0284224 A1* | 11/2012 | Yan | G06F 16/951 |
| | | | 707/E17.108 |
| 2015/0095312 A1* | 4/2015 | Gulwani | G06F 16/2282 |
| | | | 707/722 |
| 2016/0132572 A1* | 5/2016 | Chang | G06F 16/9024 |
| | | | 707/723 |
| 2018/0210864 A1 | 7/2018 | Zhang et al. | |
| 2019/0102620 A1* | 4/2019 | Siddiq | G06F 16/24575 |
| 2019/0258744 A1* | 8/2019 | Convertino | G06F 16/215 |
| 2020/0097541 A1 | 3/2020 | Christianson et al. | |
| 2020/0097759 A1* | 3/2020 | Nadim | G06F 40/258 |
| 2020/0151444 A1* | 5/2020 | Price | G06V 30/416 |
| 2021/0097070 A1* | 4/2021 | Robichaud | G06F 3/0482 |
| 2023/0306010 A1* | 9/2023 | Coleman | G06F 3/061 |
| | | | 713/2 |

* cited by examiner

200

| A clustering is performed based on features of a plurality of rows of cells and/or features of a plurality of columns of cells in a table, so as to determine candidate header cells in the table | ~S210 |

| An information extraction is performed on the table based on the candidate header cells, so as to extract attribute-attribute value pairs in the table | ~S220 |

METHOD OF EXTRACTING TABLE INFORMATION, ELECTRONIC DEVICE, AND STORAGE MEDIUM

This application claims priority to Chinese Patent Application No. 202111173960.4, filed on Oct. 8, 2021, the entire content of which is incorporated herein in its entirety by reference.

TECHNICAL FIELD

The present disclosure relates to fields of artificial intelligence and big data, in particular to fields of machine learning, knowledge graph, intelligent search and intelligent recommendation, and may be used for an intelligent extraction of an information in a table and other scenarios.

BACKGROUND

For humans, tables are an intuitive and efficient form of data representation and are widely used in various documents. The table contains a large amount of information, and it is worth digging deeply. In addition, unlike a free text, data in the table is organized in a semi-structured form. Accordingly, an information extracted from the table is more reliable than that extracted from the free text, and a data quality is better.

SUMMARY

The present disclosure provides a method of extracting a table information, an electronic device, and a storage medium.

According to an aspect of the present disclosure, a method of extracting a table information is provided, including: performing a clustering based on features of a plurality of rows of cells and/or features of a plurality of columns of cells in a table, so as to determine candidate header cells in the table; and performing an information extraction on the table based on the candidate header cells, so as to extract attribute-attribute value pairs in the table.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method as described in embodiments of the present disclosure.

According to another aspect of the present disclosure, a non-transitory computer-readable storage medium having computer instructions therein is provided, and the computer instructions are configured to cause a computer to implement the method as described in embodiments of the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Figures 1, 2:
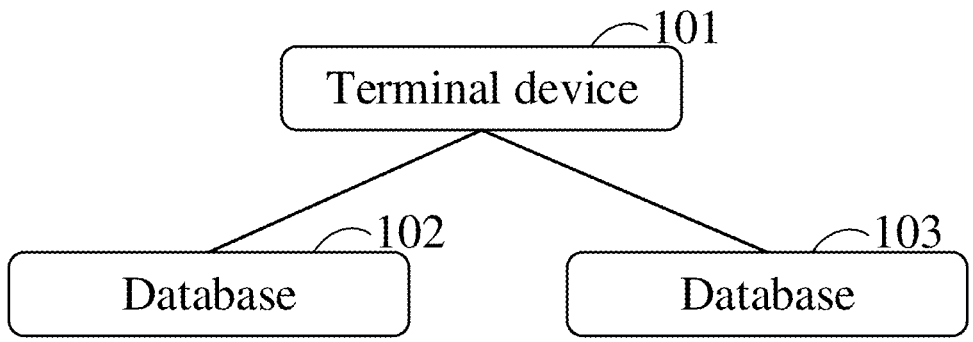
FIG. 1 schematically shows a system architecture suitable for embodiments of the present disclosure.
FIG. 2 schematically shows a flowchart of a method of extracting a table information according to embodiments of the present disclosure.

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

It should be understood that an information in a table may be extracted by the following methods.

(1) An extraction by a manual labeling or a configuration rule, that is, an extraction by a direct manual labeling or a manual configuration of a template by observing a general feature of data.

(2) An extraction by matching with an external data source, that is, an extraction by matching with an external data source such as a predetermined knowledge base.

(3) An extraction for a table in a specific format, in which a header is required to be located in a specific position in the table.

(4) An extraction by a supervised machine learning method, that is, an extraction by training a model with labeled data.

The above-mentioned methods of extracting the table information have respective defects.

Main disadvantage of method (1) is that, firstly, the manual labeling is costly, and secondly, the extraction by configuring a template has a poor generalization ability, only limited scenarios may be processed, and table data has no mobility.

Main disadvantage of method (2) is that it has a high requirement for the external data source and requires a large coverage of the external data source, and therefore, it is only suitable for a general scenario such as a general knowledge graph but not suitable for a non-general scenario such as an industry knowledge graph, and it may not be adapted to an application scenario with rich and diverse headers or with short sentences in headers.

Main disadvantage of method (3) is that it may only process a table with a specific format, and has a poor generalization and a poor mobility between table data.

Main disadvantage of method (4) is that it requires a large amount of manpower costs to label data.

Therefore, the present disclosure provides a clustering-based unsupervised machine learning method of extracting a table information, which may adapt to a structural feature of a table to extract the table information, does not rely on labeled data and an external data source, does not require the table to have a specific format, and does not require manual labeling or template configuration. Accordingly, it is possible to overcome the above-mentioned defects, improve the generalization ability and mobility, extend adaptable scenarios, and reduce a labor cost.

The present disclosure will be described in detail below with reference to the accompanying drawings and specific embodiments.

A system architecture suitable for a method and an apparatus of extracting a table information of embodiment of the present disclosure is described below.

FIG. 1 schematically shows a system architecture suitable for embodiments of the present disclosure. It should be noted that FIG. 1 is only an example of a system architecture to which embodiments of the present disclosure may be applied to help those skilled in the art understand the technical content of the present disclosure, but it does not mean that embodiments of the present disclosure may not be applied to other environments or scenarios.

As shown in FIG. 1, a system architecture 100 in embodiments of the present disclosure may include a terminal device 101, a database 102, and a database 103. The terminal device 101 may include a client or a server (such as a cloud server), which is used to perform the method of extracting the table information provided by embodiments of the present disclosure, and used to deploy the apparatus of extracting the table information provided by embodiments of the present disclosure. In addition, in embodiments of the present disclosure, the apparatus of extracting the table information may be used to implement the corresponding method of extracting the table information. Moreover, the database 102 may be used to store a table to be processed. The database 103 may be used to store an extracted table information, such as an attribute, an attribute value, and a mapping relationship between an attribute and a corresponding attribute value. The database 102 and the database 103 may be different databases or the same database.

It should be understood that the number of databases and terminal device shown in FIG. 1 is only illustrative. According to implementation needs, any number of database and terminal device may be provided.

An application scenario suitable for the method and the apparatus of extracting the table information of embodiments of the present disclosure is described below.

It should be understood that the method and the apparatus of extracting the table information of embodiments of the present disclosure may be used in a scenario of an intelligent extraction of a table information.

For example, an attribute and a corresponding attribute value, that is, an attribute-attribute value pair, may be extracted from semi-structured table data without relying on an external data source and labeled data. As shown in Table 1, it may be extracted that: an attribute of "税率" (Tax Rate) corresponds to an attribute value of "0%" when an attribute of "全年应纳 税所得额 (第纳尔 )" (Annual Taxable Income (Dinar)) corresponds to an attribute value of "0-120000"; the attribute of "税率" corresponds to an attribute value of "20%" when the attribute of "全年应纳 税所得额 (第纳尔 )" corresponds to an attribute value of "120001-360000"; and other information.

TABLE 1

| 全年应纳税所得额(第纳尔) | 税率 |
|---|---|
| 0-120000 | 0% |
| 120001-360000 | 20% |
| 360001-1440000 | 30% |
| 1440000 以上 | 35% |

Further, the method of extracting the table information provided in embodiments of the present disclosure may effectively help downstream nodes to build various knowledge graphs (such as general knowledge graphs and industry knowledge graphs), and then effectively help further downstream nodes to perform corresponding downstream tasks based on the knowledge graphs, such as intelligent retrieval of information, intelligent recommendation and intelligent question answering, and may have a wide range of application and landing prospect.

According to embodiments of the present disclosure, the present disclosure provides a method of extracting a table information.

FIG. 2 schematically shows a flowchart of a method of extracting a table information according to embodiments of the present disclosure.

As shown in FIG. 2, a method 200 of extracting a table information may include operations S210 to S230.

In operation S210, a clustering is performed based on features of a plurality of rows of cells and/or features of a plurality of columns of cells in a table, so as to determine candidate header cells in the table.

In operation S220, an information extraction is performed on the table based on the candidate header cells, so as to extract attribute-attribute value pairs in the table.

In operation S210, the clustering may be performed based on row features of the plurality of rows of cells in the table, so as to determine candidate column header cells in the table. Alternatively, in operation S210, the clustering may be performed based on column features of the plurality of columns of cells in the table, so as to determine candidate row header cells in the table. Alternatively, in operation S210, the clustering may be performed based on the row features of the plurality of rows of cells and the column features of the plurality of columns of cells in the table, so as to determine candidate header cells in the table. In this case, the determined candidate header cells may contain only the candidate column header cells, or may contain only the candidate row header cells, or may contain both the candidate column header cells and the candidate row header cells.

In operation S220, the information extraction may be performed on a table to be processed, based on the candidate header cells determined in operation S210, so as to extract attribute-attribute value pairs in the table.

Embodiments of the present disclosure may be implemented to adapt to the structural feature of the table, and the information extraction may be performed on different types of tables through an unsupervised clustering algorithm. No labeled data or external data sources are required, so that the generalization ability of the method and the data mobility may be improved, the adaptable scenarios may be extended, and the labor cost may be reduced.

In some embodiments, performing a clustering based on the features of the plurality of rows of cells and/or the features of the plurality of columns of cells in the table so as to determine the candidate header cells in the table may include: performing, for each row of cells of M rows of cells in the table, a clustering based on a row feature of each cell in the row, so as to determine a corresponding candidate column header cell; and performing, for each column of cells of N columns of cells in the table, a clustering based on a column feature of each cell in the column, so as to determine a corresponding candidate row header cell.

In some embodiments, performing an information extraction on the table based on the candidate header cells may include: performing a first operation, in response to the table being determined as a row header table based on the candidate column header cells and the candidate row header cells. The first operation includes: traversing each cell in a non-header region of the table, and extracting a corresponding attribute-attribute value pair in the table based on each attribute corresponding to a row header determined by the candidate row header cells.

Figure 3:
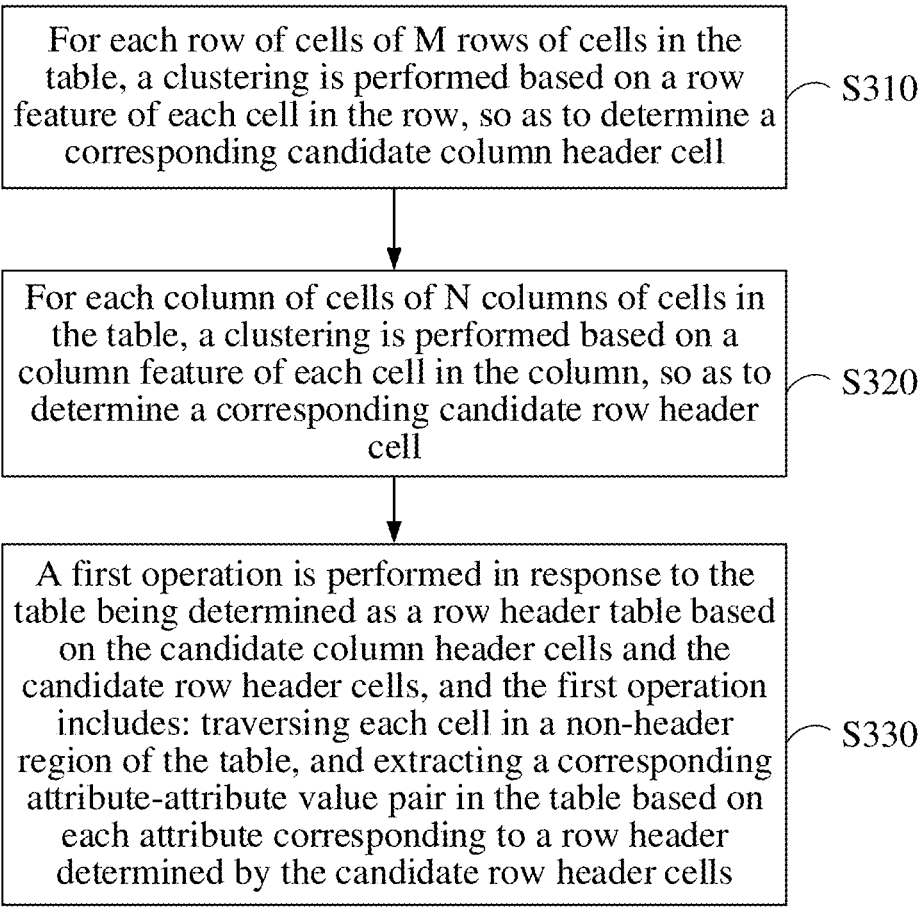
FIG. 3 schematically shows a flowchart of a method of extracting a table information according to other embodiments of the present disclosure.

FIG. 3 schematically shows a flowchart of a method of extracting a table information according to other embodiments of the present disclosure.

As shown in FIG. 3, a method 300 of extracting a table information may include operations S310 to S330.

In operation S310, for each row of cells of M rows of cells in the table, a clustering is performed based on a row feature of each cell in the row, so as to determine a corresponding candidate column header cell.

In operation S320, for each column of cells of N columns of cells in the table, a clustering is performed based on a column feature of each cell in the column, so as to determine a corresponding candidate row header cell.

In operation S330, a first operation is performed in response to the table being determined as a row header table based on the candidate column header cells and the candidate row header cells, and the first operation includes: traversing each cell in a non-header region of the table, and extracting a corresponding attribute-attribute value pair in the table based on each attribute corresponding to a row header determined by the candidate row header cells.

In some embodiments, the table on which operation S310 is performed is a table organized in a two-dimensional matrix form. A table organized in a two-dimensional matrix form contains no merged cells and only contains basic cells, and a position of each cell may be represented by a two-dimensional array. Table 2 shows a table organized in a two-dimensional matrix form, which may also be expressed in HTML format or other special structures.

TABLE 2

| Project name | Construction cost |
|---|---|
| Information administration system | 1000 |

For example, Table 2 may be expressed as:

```
<table>
<tr><td>project name</td><td>construction cost</td></tr>
<tr><td>information administration system</td><td>1000</td></tr>
</table>
```

For example, Table 2 may also be expressed as: [(0, 0, 'project name'), (0, 1, 'construction cost'), (1, 0, 'information administration system'), (1, 1, 1000)].

It should be noted that in embodiments of the present disclosure, if the table to be processed is a table organized in a two-dimensional matrix form, the above-mentioned operations may be performed directly to extract attribute-attribute value pairs in the table; if the table to be processed is not a table organized in a two-dimensional matrix form, for example, if the table to be processed is a table as shown in Table 3, a preprocessing may be performed on the table to be processed, and then the above-mentioned operations may be performed on the processed table to extract the attribute-attribute value pairs in the table. In the preprocessing stage, the table to be processed may be processed into a table organized in a two-dimensional matrix form. Specifically, if the table to be processed contains a merged cell, the merged cell needs to be split into basic cells, and each basic cell is filled with a same content. In addition, a blank row or column may be removed.

For example, the table shown in Table 3 may be processed into a table shown in Table 4 in the preprocessing stage. In the preprocessing stage, the cell of "project name" in the table is split into two basic cells with the same content, and the cell of "construction cost" is split into five basic cells with the same content. In addition, in Table 4, the blank row in Table 3 has been removed.

TABLE 3

| Project name | Construction cost | | | | |
|---|---|---|---|---|---|
| | Development cost | Implementation cost | Integration cost | Test cost | Technical consultation cost |
| Construction of marketing operation and maintenance support professional application V1.0 | 12342 | 2314 | 2143 | 2334 | 0 |
| Information administration system | 888 | 12333 | 9876 | 11132 | 0 |
| Total | 123 | 342 | 2341 | 432 | 0 |

TABLE 4

| Project name | Construction cost | Construction cost | Construction cost | Construction cost | Construction cost |
|---|---|---|---|---|---|
| Project name | Development cost | Implementation cost | Integration cost | Test cost | Technical consultation cost |
| Construction of marketing operation and maintenance support professional application V1.0 | 12342 | 2314 | 2143 | 2334 | 0 |

TABLE 4-continued

| Project name Project name | Construction cost Development cost | Construction cost Implementation cost | Construction cost Integration cost | Construction cost Test cost | Construction cost Technical consultation cost |
|---|---|---|---|---|---|
| Information administration system | 888 | 12333 | 9876 | 11132 | 0 |
| Total | 123 | 342 | 2341 | 432 | 0 |

The table shown in Table 4 may be expressed as:

['project name', 'construction cost', 'construction cost', 'construction cost', 'construction cost', 'construction cost']

['project name', 'development cost', 'implementation cost', 'integration cost', 'test cost', 'technical consultation cost']

['construction of marketing operation and maintenance support professional application V1.0', '12342', '2314', '2143', '2334', '0']

['information administration system', '888', '12333', '9876', '11132', '0']

['total', '123', '342', '2341', '432', '0'].

For example, in a case that the table to be processed is a target table with M rows and N columns of cells, it is possible to determine whether the target table contains candidate column header cells by performing operation S310 on the target table, and if it is determined that the table contains candidate column header cells, it is possible to further determine which candidate column header cells are contained in the table.

Similarly, it is possible to determine whether the target table contains candidate row header cells by performing operation S320 on the target table, and if it is determined that the table contains candidate row header cells, it is possible to further determine which candidate row header cells are contained in the table.

If a set of candidate column header cells obtained in operation S310 is an empty set, and a set of candidate row header cells obtained in operation S320 is a non-empty set, it indicates that the target table contains only row header cells and does not contain column header cells. In this case, the first operation in operation S330 may be performed, including traversing each cell in a non-header region of the table, and extracting a corresponding attribute-attribute value pair in the table based on each attribute corresponding to a row header determined by the candidate row header cells.

In embodiments of the present disclosure, for the candidate row header cells, when and only when a proportion of cells in a row that are determined to be candidate row header cells is greater than a threshold value, that row of cells may be determined as row header cells. For example, for Table 4 shown above, when a proportion of cells in the $0^{th}$ row that are determined to be candidate row header cells is greater than 60%, the $0^{th}$ row of cells may be determined as row header cells.

In embodiments of the present disclosure, in the first operation, all cells in the non-header region of the table may be traversed. For each cell traversed, it is possible to search a corresponding header cell in a direction of decreasing a row number along a column where that cell is located, so as to form an attribute-attribute value pair. In a case of multi-level headers, the attribute may be a list containing a plurality of values. As shown in Table 4, for the cell of "12342" in the second row and the first column, by searching along the column where it is located, the corresponding header "[construction cost, development cost]: 12342" may be obtained.

In the case of multi-level headers, after the attribute-attribute value pairs are extracted, an attribute fusion may be performed on the attribute-attribute value pairs in a same row. For attribute-attribute value pairs in different rows, if the fused attributes of each row are consistent, they may be combined directly; if the fused attributes of each row are inconsistent, a further attribute fusion may be performed.

For example, as shown in Table 4, for the attribute-attribute value pairs "[construction cost, development cost]: 12342" and "[construction cost, implementation cost]: 2314", an attribute fusion may be performed to obtain "[construction cost]: [[development cost]: 12342, [implementation cost]: 2314]". Through a direct combination, a plurality of results may be combined directly into a list.

For example, for the table shown in Table 1, by performing the above-mentioned operations, the following attribute-attribute value pairs (i.e., a mapping between attributes and corresponding attribute values) may be output:

{'全年应纳 税所得额(第纳尔)': '0-120000', '税率': '0%'}

{'全年应纳 税所得额(第纳尔)': '120001-360000', '税率': '20%'}

{'全年应纳 税所得额(第纳尔)': '360001-1440000', '税率': '30%'}

{'全年应纳 税所得额(第纳尔)': '1440000 以上', '税率': '35%'}.

Through embodiments of the present disclosure, the clustering-based method may adapt to the structural feature of the table to extract the table information, and no labeled data or external data sources are required, so that the generalization ability of the method and the data mobility may be improved, the adaptable scenarios may be extended, and the labor cost may be reduced.

In some embodiments, performing the information extraction on the table based on the candidate header cells may include: performing a second operation, in response to the table being determined as a column header table based on the candidate column header cells and the candidate row header cells. The second operation includes traversing each cell in a non-header region of the table, and extracting a corresponding attribute-attribute value pair in the table based on each attribute corresponding to a column header determined by the candidate column header cells.

Alternatively, performing the information extraction on the table based on the candidate header cells may include: in response to determining, based on the candidate column header cells and the candidate row header cells, that the table contains both the row header and the column header, performing at least one selected from: the first operation in response to determining that contents of columns in the table are similar; performing the second operation in response to determining that contents of rows in the table are similar; or performing no information extraction on the table, in response to determining that a similarity of contents of columns in the table is consistent with a similarity of contents of rows in the table.

In embodiments of the present disclosure, if a calculated set of candidate row header cells is an empty set, and a calculated set of candidate column header cells is a non-empty set, it indicates that the target table contains only column header cells and do not contain row header cells. In this case, the above-mentioned second operation may be performed, including traversing each cell in the non-header region of the table, and extracting a corresponding attribute-attribute value pair in the table based on each attribute corresponding to a column header determined by the candidate column header cells.

In embodiments of the present disclosure, for the candidate column header cells, when and only when a proportion of cells in a column that are determined to be the candidate column header cells is greater than a threshold value, that column of cells may be determined as column header cells.

In embodiments of the present disclosure, in the second operation, all cells in the non-header region of the table may be traversed. For each cell traversed, it is possible to search a corresponding header cell in a direction of decreasing a column number along a row where that cell is located, so as to form an attribute-attribute value pair. In a case of multi-level headers, the attribute may be a list containing a plurality of values.

In the case of multi-level headers, after the attribute-attribute value pairs are extracted, an attribute fusion may be further performed on attribute-attribute value pairs in a same column. For attribute-attribute value pairs in different columns, if the fused attributes of each column are consistent, they may be combined directly; and if the fused attributes of each column are inconsistent, a further attribute fusion may be performed.

In embodiments of the present disclosure, if the calculated set of candidate row header cells is a non-empty set and the calculated set of candidate column header cells is also a non-empty set, it indicates that the target table contains both row header cells and column header cells. In this case, it is possible to determine whether contents in the table are more similar in columns or in rows, and then select to perform the first operation or the second operation according to a determination result.

It should be understood that if the contents of the table are more similar in columns, it may be determined that the table is a row header table. Similarly, if the contents of the table are more similar in rows, it may be determined that the table is a column header table.

If it is determined that a similarity of the contents in the table in terms of columns is consistent with a similarity of the contents in the table in terms of rows, it may be determined that the header may not be accurately selected according to the method provided in embodiments of the present disclosure, and therefore no information extraction is performed on such a table.

Through embodiments of the present disclosure, different operations may be performed on tables with different header types to flexibly and accurately locate a position of the header, and then the table information may be extracted accurately and discriminatively from header cells and non-header cells.

In some embodiments, a similarity of contents of rows in the table and a similarity of contents of columns in the table may be determined by: determining an average intra-row distance of the table; determining an average intra-column distance of the table; and comparing the average intra-row distance and the average intra-column distance to determine the similarity of contents of rows in the table and the similarity of contents of columns in the table.

In embodiments of the present disclosure, for a table containing both a row header and a column header, the average intra-row distance and the average intra-column distance of the table may be calculated and compared to help determine whether the contents of the table are more similar in columns or in rows.

For example, the average intra-row distance and the average intra-column distance of the table may be determined according to the following operations.

In a row direction, a row feature of each cell in the table may be acquired, and then for each row of cells, a k-means clustering may be performed on data in the row based on the row feature of each cell in the row. If a number of clusters is set to two, that is, two clusters are obtained by clustering, then an intra-cluster distance of one of the two clusters whose average distance from elements in the cluster to a cluster center is smaller than an average distance of the other of the two clusters may be determined as an intra-row distance of that row. The above-mentioned operations may be repeatedly performed to obtain an intra-row distance vector $[d_1^h, d_2^h, \ldots, d_m^h]$ corresponding to the rows of cells in the entire table.

Similarly, in a column direction, a column feature of each cell in the table may be acquired, and then for each column of cells, a k-means clustering may be performed on data in the column based on the column feature of each cell in the column. If a number of clusters is set to two, that is, two clusters are obtained by clustering, an intra-cluster distance of one of the two clusters whose average distance from elements in the cluster to a cluster center is smaller than an average distance of the other of the two clusters may be determined as an intra-column distance of that column. The above-mentioned operations may be repeatedly performed to obtain an intra-column distance vector $[d_1^v, d_2^v, \ldots, d_n^v]$ corresponding to the columns of cells in the entire table.

Further, after removing a maximum intra-row distance value and a minimum intra-row distance value from the intra-row distance vector of the table, an average value of the remaining intra-row distances may be calculated, and the average value may be determined as the average intra-row distance of the table, which is denoted as $\overline{d}^h$. Similarly, the average intra-column distance $\overline{d}^v$ of the table may be calculated.

If $\overline{d}^h < \overline{d}^v$, it may be determined that the contents of the table are more similar in rows and the table may have a column header. If $\overline{d}^h > \overline{d}^v$, it may be determined that the contents of the table are more similar in columns and the table may have a row header. If $\overline{d}^h = \overline{d}^v$, it is determined that the similarity of the contents of the table in rows is consistent with the similarity of the contents of the table in columns. In this case, the header may not be selected correctly by the method provided in embodiments of the present disclosure, and no information extraction is performed on the table.

Through embodiments of the present disclosure, it is possible to accurately determine whether the contents in the table are more similar in columns or in rows.

In some embodiments, performing a clustering based on the row feature of each cell in a row to determine the corresponding candidate column header cell may include: for each row of cells, performing a clustering based on the row feature of each cell in the row to obtain two clusters; and determining at least one cell, corresponding to one of the two clusters that has a smaller number of elements than that of the other of the two clusters, as the candidate column header cell in the row.

Alternatively, performing a clustering based on the row feature of each cell in a row to determine the corresponding candidate column header cell may include: for each row of cells, performing a clustering based on the row feature of each cell in the row to obtain two clusters; and determining a cell, corresponding to one of the two clusters that does not have an element hitting a blacklist and that has a smaller number of elements than that of the other of the two clusters, as the candidate column header cell in the row, where a specific cell feature is recorded in the blacklist. For example, for Table 1, a feature containing both "number" and "text" may be recorded in the blacklist to exclude a possibility that the cell of "1440000以上" (above 1440000) is recognized as a header cell.

It should be understood that the column header is in a form of a column, and the attribute values for the attributes corresponding to the column header may be in a form of rows. Similarly, the row header is in the form of a row, and the attribute values for the attributes corresponding to the row header may be in the form of columns.

For example, the column header may be calculated by the following operations.

In operation (1-1), the row feature of each cell in each row of the table is calculated to obtain feature vectors $[x_1^1, x_2^1, \ldots, x_n^1]$, $[x_1^2, x_2^2, \ldots, x_n^2]$, $\ldots$, $[x_1^m, x_2^m, \ldots, x_n^m]$ corresponding to the rows of the table.

In operation (1-2), a k-means clustering is performed on each element in the feature vectors corresponding to the rows in (1-1). If the number of clusters is set to two, a cell, corresponding to one of two clusters that does not hit a configured blacklist (such as the "1440000以上" shown in Table 1, which contains both numbers and non-numbers) and that has a smaller number of elements than that of the other of the two clusters, may be recorded as a candidate column header cell.

In operation (1-3), the above two steps are repeatedly performed, that is, the above (1-1) and (1-2) are repeatedly performed, until possible candidate column header cells in all rows in the table are calculated.

In operation (1-4), for all the candidate column header cells, when and only when a proportion of cells in a column that are determined to be candidate column header cells is greater than a threshold value, that column may be determined as a column header.

Similarly, the row header may be calculated by the following operations.

In operation (2-1), the column feature of each cell in each column of the table is calculated to obtain feature vectors $[y_1^1, y_2^1, \ldots, y_m^1]$, $[y_1^2, y_2^2, \ldots, y_m^2]$, $\ldots$, $[y_1^n, y_2^n, \ldots, y_m^n]$ corresponding to the columns of the table.

In operation (2-2), a k-means clustering is performed on each element in the feature vectors corresponding to the columns in (2-1). If the number of clusters is set to two, a cell, corresponding to one of two clusters that does not hit a configured blacklist and that has a smaller number of elements than that of the other of the two clusters, may be recorded as a candidate row header cell.

In operation (2-3), the above two steps are repeatedly performed, that is, the above (2-1) and (2-2) are repeatedly performed, until possible candidate row header cells in all columns in the table are calculated.

In operation (2-4), for all the candidate row header cells, when and only when a proportion of cells in a row that are determined to be candidate row header cells is greater than a threshold value, that row may be determined as a row header.

Through embodiments of the present disclosure, it is possible to determine the row header and/or the column header simply and accurately.

Figure 4:
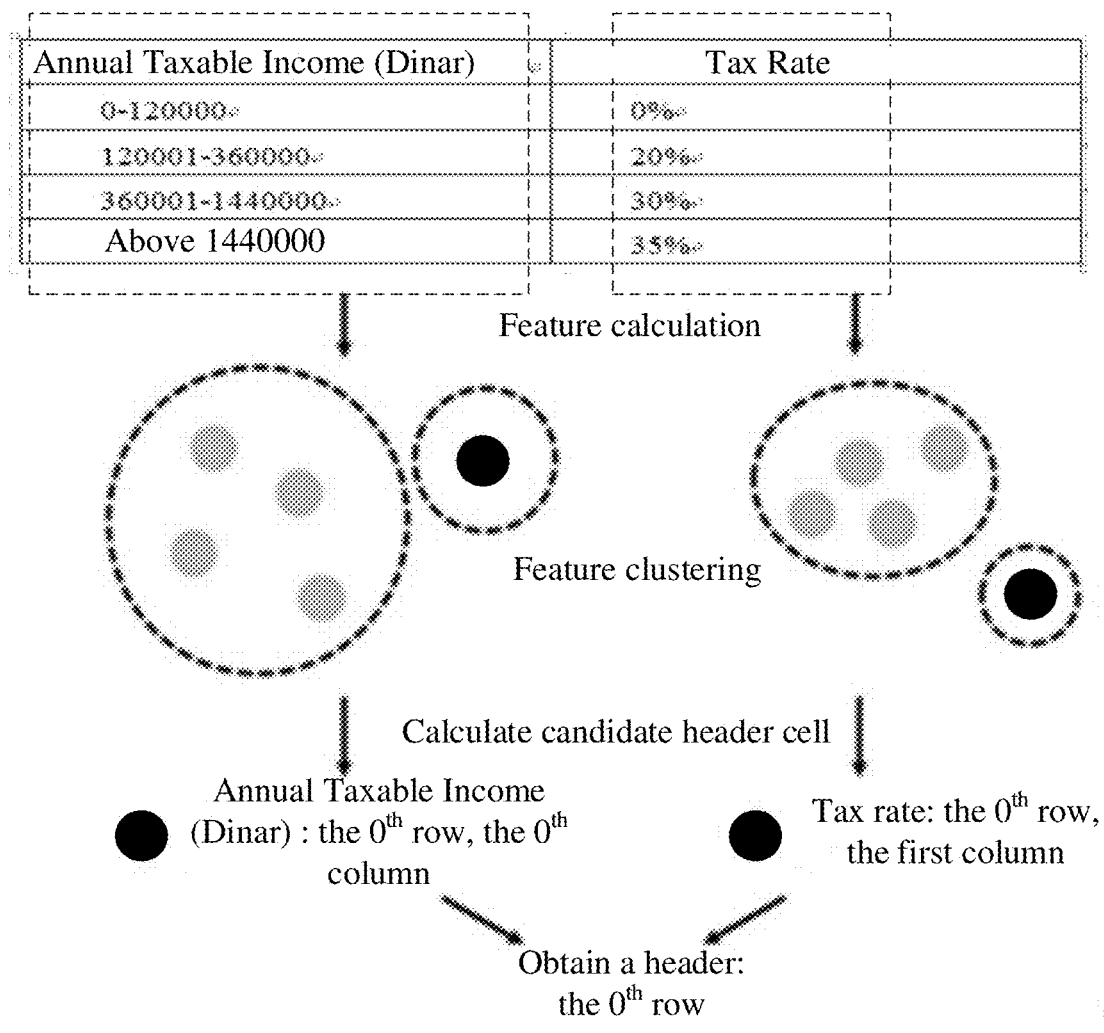
FIG. 4 schematically shows a schematic diagram of determining a header in a table according to embodiments of the present disclosure.

The header in the table to be processed may be determined based on a basic principle shown in FIG. 4. That is, a feature calculation is performed, then a feature clustering is performed, and then the candidate header cell is calculated according to a cluster having a smaller number of elements. For example, a candidate header cell determined by a left column of the table shown in FIG. 4 is the cell corresponding to "Annual Taxable Income (Dinar)", that is, the cell in the $0^{th}$ row and the $0^{th}$ column. For example, a candidate header cell determined by a right column of the table shown in FIG. 4 is the cell corresponding to "Tax Rate", that is, the cell in the $0^{th}$ row and the first column. Further, it may be determined that the header of the table shown in FIG. 4 is in $0^{th}$ row.

In some embodiments, the row feature may include a data feature and/or a statistical feature. Further, in some embodiments, the statistical feature may include at least one selected from: a token statistical feature, a part-of-speech statistical feature, a character statistical feature, or a word frequency statistical feature.

In some embodiments, the method may further include: before performing the clustering based on the features of the plurality of rows of cells and/or the features of the plurality of columns of cells in the table, for the plurality of rows of cells and/or the plurality of columns of cells, replacing a number in each cell with a uniform number, and then extracting a row feature of a content in each cell.

It should be noted that the features used in embodiments of the present disclosure may be a combination of two types of features: the data feature and the statistical feature. As the clustering method is used in embodiments of the present disclosure and there is no training process, the used features may be easily added and removed.

Further, in embodiments of the present disclosure, the data feature refers to a feature of a data itself, such as a data length. The statistical feature refers to a feature of data presented in a set of data, such as a number of times data occurs.

In addition, a corresponding weight may be set for each feature to facilitate fine-tuning for different tasks. In addition, during the feature extraction, if a content of a cell contains a number, regardless of a size and a length of the number, the number contained in the cell may be replaced with a uniform number, such as 1. This is because that numbers may be seen as similar to each other. For convenience of calculation, the numbers in all cells may be replaced with 1.

For example, the data feature may include but not be limited to: whether numbers are contained or not, pure numbers or not, whether Chinese is contained or not, pure Chinese or not, whether English is contained or not, pure English or not, a data length, a row where the data is located, a column where the data is located, etc. "Yes" may be expressed as 1 and "No" may be expressed as 0.

For example, the statistical feature may include but not be limited to: a token statistical feature, a part-of-speech statistical feature, a character statistical feature, an occurrence frequency feature, etc. The token statistical feature, the part-of-speech statistical feature and the character statistical feature are Multi-hot codes obtained statistically from a set of data. Multi-hot is characterized in that it allows multiple bits to be 1 at the same time in the encoding.

For example, taking Table 1 above as an example, if all features have a weight of 1, a calculation of the column feature of the cell of "税率" in the $0^{th}$ row and the first column may include the following steps. The data feature is calculated to obtain: [0 (representing no numbers are contained), 0 (representing not pure numbers), 1 (representing Chinese is contained), 1 (representing pure Chinese), 0 (representing no English is contained), 0 (representing not pure English), 2 (representing a data length of 2), 0 (representing being located in the $0^{th}$ row), 1 (representing being located in the first column)]. The statistical feature is calculated to obtain: [1, 0, 0 (the first three digits represent the token statistical feature), 1, 0, 0 (these three digits represent the part-of-speech statistical feature), 1, 1, 0, 0 (these four digits represent the character statistical feature), 1 (represent the number of occurrence)]. The above-mentioned statistical feature may be explained as follows. For all the elements corresponding to the first column, after replacing the numbers with 1 and tokenizing, [税率, 1, %] may be obtained. The cell of "税率" only hits a first word, then the token feature is [1, 0, 0]. For all the elements corresponding to the first column, the part of speech corresponding to the tokens includes [noun, number, symbol]. The cell of "税率" only hits the noun, then the part-of-speech statistical feature is [1, 0, 0]. All the elements corresponding to first column contain the characters [税, 率, 1, %], then the character statistical feature is [1, 1, 0, 0]. Finally, the above-mentioned data feature and statistical feature may be combined to obtain the column feature [0, 0, 1, 1, 0, 0, 2, 0, 1, 1, 0, 0, 1, 0, 0, 1, 1, 0, 0, 1] of the cell of "税率".

It should be understood that, benefited from a development of an artificial intelligence technology, natural language processing-related technologies have been greatly developed in recent years. In existing machine learning-based methods, a hidden statistical feature of data may be learned through a manually extracted feature, which is suitable for an application scenario with a very small data volume and an obvious data feature. Different from a popular deep learning algorithm in recent years, the existing machine learning-based methods have a higher training and processing efficiency and a lower requirement for hardware, and is very suitable for applications in a table information extraction task with no labeled data, a strong structural feature and a highly discrete distribution of semantic features of data (that is, the expression of data content in each table is flexible and diverse, for example, the "税率 (tax rate)" may also be expressed as ". . . 税率 (tax rate for . . . )"). In embodiments of the present disclosure, the clustering method adopted is an existing machine learning method.

In addition, an objective of the table information extraction technology described in embodiments of the present disclosure is to extract an attribute and a corresponding attribute value information from a semi-structured table data. The method implemented by the present disclosure is a clustering-based method of extracting an unsupervised table information, which may perform, without manually labeled data and without relying on any external data source, an extraction of table information in various formats by using the structural feature of the table, and no training is required. The method proposed in the present disclosure may be applied to rich scenarios, has a strong mobility, and requires a low labor cost.

In addition, when using the method provided in embodiments of the present disclosure, for new documents, new attributes and new expressions, there is no need for excessive manual intervention and no need to formulate a new extraction rule for data. The algorithms provided in embodiments of the present disclosure utilize the structural feature of the table itself, eliminate the need for manually labeled samples, and require a low cold start cost. In addition, the algorithms provided in embodiments of the present disclosure do not rely on external data sources, and a threshold of using the algorithms is reduced. Moreover, the present disclosure may be implemented to process rich header scenarios, and is applicable to both a construction of general knowledge graph and a construction of industry knowledge graph. In addition, the algorithms provided in embodiments of the present disclosure are flexible and changeable, may process a variety of table types and have a low dependence on formats of tables, and may handle the case of multi-level headers. In addition, the algorithms provided in embodiments of the present disclosure have a high processing efficiency, require no training process, and have a low requirement for hardware.

According to embodiments of the present disclosure, the present disclosure further provides an apparatus of extracting a table information.

Figure 5:
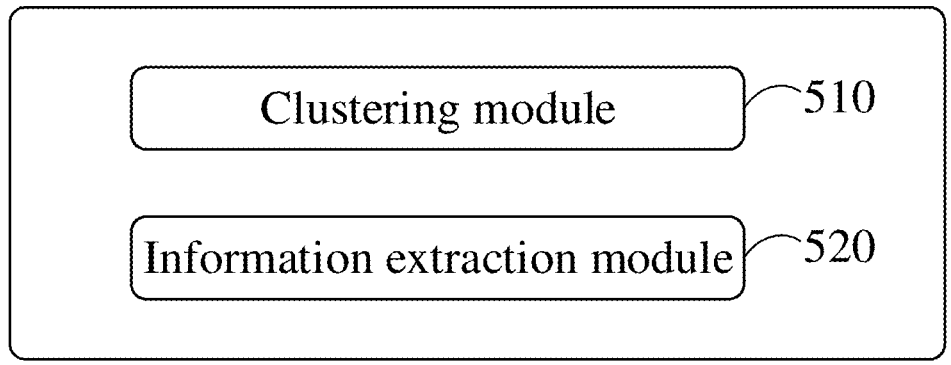
FIG. 5 schematically shows a block diagram of an apparatus of extracting a table information according to embodiments of the present disclosure.

FIG. 5 schematically shows a block diagram of an apparatus of extracting a table information according to embodiments of the present disclosure.

As shown in FIG. 5, an apparatus 500 of extracting a table information may include a clustering module 510 and an information extraction module 520.

The clustering module 510 is used to perform a clustering based on features of a plurality of rows of cells and/or features of a plurality of columns of cells in a table, so as to determine candidate header cells in the table.

The information extraction module 520 is used to perform an information extraction on the table based on the candidate header cells, so as to extract attribute-attribute value pairs in the table.

In some embodiments, the clustering module includes: a first clustering unit used to perform, for each row of M rows of cells in the table, a clustering based on a row feature of each cell in the row so as to determine a corresponding candidate column header cell; and a second clustering unit used to perform, for each column of N columns of cells in the table, a clustering based on a column feature of each cell in the column so as to determine a corresponding candidate row header cell.

In some embodiments, the information extraction module is further used to: perform a first operation in response to the table being determined as a row header table based on the candidate column header cells and the candidate row header cells. The first operation includes: traversing each cell in a non-header region of the table, and extracting a corresponding attribute-attribute value pair in the table based on each attribute corresponding to a row header determined by the candidate row header cells.

In some embodiments, the information extraction module is further used to: perform a second operation in response to the table being determined as a column header table based on the candidate column header cells and the candidate row header cells. The second operation includes: traversing each cell in a non-header region of the table, and extracting a corresponding attribute-attribute value pair in the table based on each attribute corresponding to a column header determined by the candidate column header cells.

In some embodiments, the information extraction module is further used to: in response to determining that the table contains a row header and a column header based on the candidate column header cells and the candidate row header cells, perform the first operation in response to determining that contents of columns in the table are similar; and/or perform the second operation in response to determining that contents of rows in the table are similar; and/or perform no information extraction on the table, in response to determining that a similarity of contents of rows in the table is consistent with a similarity of contents of columns in the table.

In some embodiments, the similarity of contents of rows in the table and the similarity of contents of columns in the table are determined by: determining an average intra-row distance of the table; determining an average intra-column distance of the table; and comparing the average intra-row distance and the average intra-column distance to determine the similarity of contents of rows in the table and the similarity of contents of columns in the table.

In some embodiments, the first clustering unit includes: a first clustering sub-unit used to, for each row of cells, perform a clustering based on the row feature of each cell in the row to obtain two clusters; and a first determination sub-unit used to determine at least one cell, corresponding to one of the two clusters that has a smaller number of elements than that of the other of the two clusters, as the candidate column header cell in the row.

In some embodiments, the first clustering unit includes: a second clustering sub-unit used to, for each row of cells, perform a clustering based on the row feature of each cell in the row to obtain two clusters; and a second determination sub-unit used to determine a cell, corresponding to one of the two clusters that does not have an element hitting a blacklist and that has a smaller number of elements than that of the other of the two clusters, as the candidate column header cell in the row, where a specific cell feature is recorded in the blacklist.

In some embodiments, the feature includes a data feature and/or a statistical feature.

In some embodiments, the statistical feature includes at least one selected from: a token statistical feature, a part-of-speech statistical feature, a character statistical feature, or a word frequency statistical feature.

In some embodiments, the table is in a form of a two-dimensional matrix.

In some embodiments, the apparatus further includes: a feature extraction module used to, before performing the clustering based on the features of the plurality of rows of cells and/or the features of the plurality of columns of cells in the table, for the plurality of rows of cells and/or the plurality of columns of cells: replace a number in each cell with a uniform number; and extract a row feature of each cell.

It should be understood that embodiments of the apparatus part of the present disclosure correspond to identical or similar embodiments of the method part of the present disclosure, and the technical problems solved and the technical effects achieved also correspond to same or similar ones, which will not be repeated here.

According to embodiments of the present disclosure, the present disclosure further provides an electronic device, a readable storage medium, and a computer program product.

Figure 6:
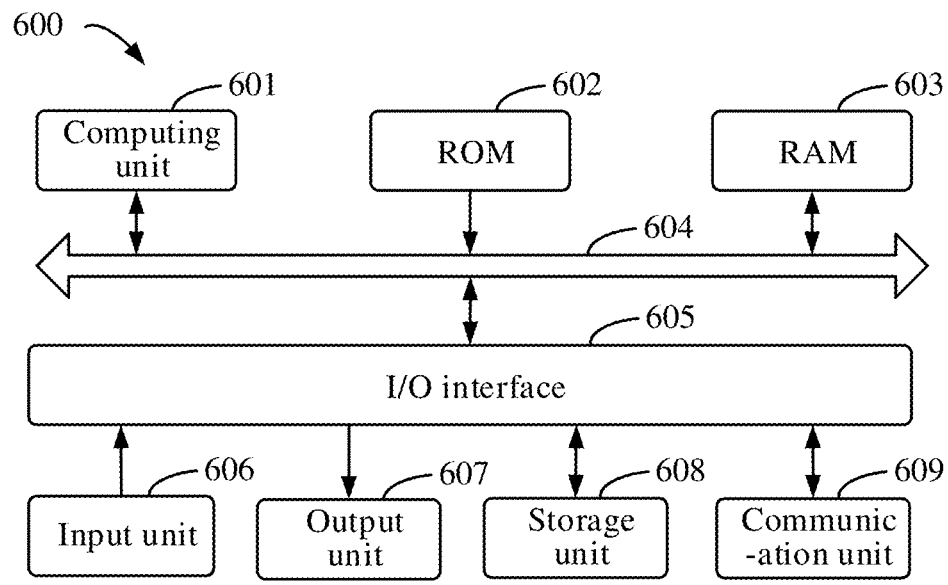
FIG. 6 schematically shows a block diagram of an electronic device for implementing embodiments of the present disclosure.

FIG. 6 shows a schematic block diagram of an exemplary electronic device 600 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the electronic device 600 includes a computing unit 601 which may perform various appropriate actions and processes according to a computer program stored in a read only memory (ROM) 602 or a computer program loaded from a storage unit 608 into a random access memory (RAM) 603. In the RAM 603, various programs and data necessary for an operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, or a mouse; an output unit 607, such as displays or speakers of various types; a storage unit 608, such as a disk, or an optical disc; and a communication unit 609, such as a network card, a modem, or a wireless communication transceiver. The communication unit 609 allows the electronic device 600 to exchange information/data with other devices through a computer network such as Internet and/or various telecommunication networks.

The computing unit 601 may be various general-purpose and/or dedicated processing assemblies having processing and computing capabilities. Some examples of the computing units 601 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 601 executes various methods and steps described above, such as the method of extracting the table information. For example, in some embodiments, the method of extracting the table information may be implemented as a computer software program which is tangibly embodied in a machine-readable medium, such as the storage unit 608. In some embodiments, the computer program may be partially or entirely loaded and/or installed in the electronic device 600 via the ROM 602 and/or the communication unit 609. The computer program, when loaded in the RAM 603 and executed by the computing unit 601, may execute one or more steps in the method of extracting the table information described above. Alternatively, in other embodiments, the computing unit 601 may be configured to perform the method of extracting the table information by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, also known as a cloud computing server or a cloud host, which is a host product in a cloud computing service system to solve shortcomings of difficult management and weak business scalability existing in an existing physical host and VPS (Virtual Private Server) service. The server may also be a server of a distributed system or a server combined with a block-chain.

In the technical solution of the present disclosure, the collection, storage, use, processing, transmission, provision, disclosure and application of table information involved are all in compliance with the provisions of relevant laws and regulations, and necessary confidentiality measures have been taken, and it does not violate public order and good morals. In the technical solution of the present disclosure, before obtaining or collecting the user's personal information, the user's authorization or consent is obtained.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented method of extracting a table information by one or more processors, the method comprising:
    performing a clustering based on features of a plurality of rows of cells and/or features of a plurality of columns of cells in a table, so as to determine candidate header cells in the table; and
    performing an information extraction on the table based on the candidate header cells, so as to extract attribute-attribute value pairs in the table, wherein the performing the clustering comprises: for each row of cells,
    calculating a row feature of each cell in the row to obtain a feature vector corresponding to the row;
    performing k-means clustering on each element in the feature vector corresponding to the row to obtain two clusters; and
    determining a cell, corresponding to one of the two clusters that does not have an element hitting a blacklist and that has a smaller number of elements than that of the other of the two clusters, as a candidate column header cell in the row, wherein a specific cell feature is recorded in the blacklist.

2. The method according to claim 1, wherein the performing a clustering based on features of a plurality of rows of cells and/or features of a plurality of columns of cells in a table so as to determine candidate header cells in the table comprises:

performing, for each row of M rows of cells in the table, a clustering based on a row feature of each cell in the row so as to determine a corresponding candidate column header cell; and performing, for each column of N columns of cells in the table, a clustering based on a column feature of each cell in the column so as to determine a corresponding candidate row header cell.

3. The method according to claim 2, wherein the performing an information extraction on the table based on the candidate header cells comprises performing a first operation, in response to the table being determined as a row header table based on the candidate column header cells and the candidate row header cells, wherein the first operation comprises:

traversing each cell in a non-header region of the table, and extracting a corresponding attribute-attribute value pair in the table based on each attribute corresponding to a row header determined by the candidate row header cells.

4. The method according to claim 2, wherein the performing an information extraction on the table based on the candidate header cells comprises performing a second operation, in response to the table being determined as a column header table based on the candidate column header cells and the candidate row header cells, wherein the second operation comprises:

traversing each cell in a non-header region of the table, and extracting a corresponding attribute-attribute value pair in the table based on each attribute corresponding to a column header determined by the candidate column header cells.

5. The method according to claim 2, further comprising:
in response to determining that the table contains a row header and a column header based on the candidate column header cells and the candidate row header cells, performing the first operation in response to determining that contents of columns in the table are similar; and/or performing the second operation in response to determining that contents of rows in the table are similar; and/or performing no information extraction on the table in response to determining that a similarity of contents of rows in the table is consistent with a similarity of contents of columns in the table.

6. The method according to claim 5, wherein the similarity of contents of rows in the table and the similarity of contents of columns in the table are determined by:

determining an average intra-row distance of the table;
determining an average intra-column distance of the table; and comparing the average intra-row distance and the average intra-column distance to determine the similarity of contents of rows in the table and the similarity of contents of columns in the table.

7. The method according to claim 2, wherein performing a clustering based on a row feature of each cell in each row so as to determine a corresponding candidate column header cell comprises: for each row of cells, performing a clustering based on the row feature of each cell in the row to obtain two clusters; and determining at least one cell, corresponding to one of the two clusters that has a smaller number of elements than that of the other of the two clusters, as the candidate column header cell in the row.

8. The method according to claim 2, wherein the performing the clustering comprises, for each row of cells, performing a clustering based on the row feature of each cell in the row to obtain the two clusters.

9. The method according to claim 1, wherein the feature comprises a data feature and/or a statistical feature.

10. The method according to claim 9, wherein the feature comprising a statistical feature and the statistical feature comprises at least one selected from: a token statistical feature, a part-of-speech statistical feature, a character statistical feature, or a word frequency statistical feature.

11. The method according to claim 1, wherein the table is in a form of a two-dimensional matrix.

12. The method according to claim 1, further comprising:
before performing the clustering based on the features of the plurality of rows of cells and/or the features of the plurality of columns of cells in the table:

for the plurality of rows of cells and/or the plurality of columns of cells, replacing a number in each cell with a uniform number; and extracting a row feature of each cell.

13. An electronic device, comprising:
at least one processor; and
a memory communicatively connected to the at least one processor, wherein the memory stores instructions executable by the at least one processor, and the instructions, when executed by the at least one processor, cause the at least one processor to at least:

perform a clustering based on features of a plurality of rows of cells and/or features of a plurality of columns of cells in a table, so as to determine candidate header cells in the table; and perform an information extraction on the table based on the candidate header cells, so as to extract attribute-attribute value pairs in the table, wherein the instructions are further configured to cause the at least one processor to at least: for each row of cells, calculate a row feature of each cell in the row to obtain a feature vector corresponding to the row, perform k-means clustering on each element in the feature vector corresponding to the row to obtain two clusters, and determine a cell, corresponding to one of the two clusters that does not have an element hitting a blacklist and that has a smaller number of elements than that of the other of the two clusters, as a candidate column header cell in the row, wherein a specific cell feature is recorded in the blacklist.

14. The electronic device according to claim 13, wherein the instructions are further configured to cause the at least one processor to at least:

perform, for each row of M rows of cells in the table, a clustering based on a row feature of each cell in the row so as to determine a corresponding candidate column header cell; and perform, for each column of N columns of cells in the table, a clustering based on a column feature of each cell in the column so as to determine a corresponding candidate row header cell.

15. The electronic device according to claim 14, wherein the instructions are further configured to cause the at least one processor to at least perform a first operation, in response to the table being determined as a row header table based on the candidate column header cells and the candidate row header cells, wherein the first operation comprises:
 traversal of each cell in a non-header region of the table, and
 extraction of a corresponding attribute-attribute value pair in the table based on each attribute corresponding to a row header determined by the candidate row header cells.

16. The electronic device according to claim 14, wherein the instructions are further configured to cause the at least one processor to at least perform a second operation, in response to the table being determined as a column header table based on the candidate column header cells and the candidate row header cells, wherein the second operation comprises:
 traversal of each cell in a non-header region of the table, and
 extraction of a corresponding attribute-attribute value pair in the table based on each attribute corresponding to a column header determined by the candidate column header cells.

17. The electronic device according to claim 14, wherein the instructions are further configured to cause the at least one processor to at least:
 in response to a determination that the table contains a row header and a column header based on the candidate column header cells and the candidate row header cells,
 perform the first operation in response to a determination that contents of columns in the table are similar; and/or
 perform the second operation in response to a determination that contents of rows in the table are similar; and/or
 perform no information extraction on the table in response to a determination that a similarity of contents of rows in the table is consistent with a similarity of contents of columns in the table.

18. A non-transitory computer-readable storage medium having computer instructions therein, wherein the computer instructions are configured to cause a computer system to at least:
 perform a clustering based on features of a plurality of rows of cells and/or features of a plurality of columns of cells in a table, so as to determine candidate header cells in the table; and
 perform an information extraction on the table based on the candidate header cells, so as to extract attribute-attribute value pairs in the table,
wherein the instructions are further configured to cause the at least one processor to at least: for each row of cells,
 calculate a row feature of each cell in the row to obtain a feature vector corresponding to the row;
 perform k-means clustering on each element in the feature vector corresponding to the row to obtain two clusters; and
 determine a cell, corresponding to one of the two clusters that does not have an element hitting a blacklist and that has a smaller number of elements than that of the other of the two clusters, as a candidate column header cell in the row, wherein a specific cell feature is recorded in the blacklist.

19. The non-transitory computer-readable storage medium according to claim 18, wherein the instructions are further configured to cause the computer to at least:
 perform, for each row of M rows of cells in the table, a clustering based on a row feature of each cell in the row so as to determine a corresponding candidate column header cell; and
 perform, for each column of N columns of cells in the table, a clustering based on a column feature of each cell in the column so as to determine a corresponding candidate row header cell.

20. The non-transitory computer-readable storage medium according to claim 19, wherein the instructions are further configured to cause the computer to at least perform a first operation, in response to the table being determined as a row header table based on the candidate column header cells and the candidate row header cells, wherein the first operation comprises:
 traversal of each cell in a non-header region of the table, and
 extraction of a corresponding attribute-attribute value pair in the table based on each attribute corresponding to a row header determined by the candidate row header cells.

* * * * *